(12) United States Patent
McLemore et al.

(10) Patent No.: US 6,742,446 B2
(45) Date of Patent: Jun. 1, 2004

(54) RACK DEVICE WELL SUITED FOR USE WITH A DEEP FRYING APPARATUS AND METHOD OF USING THE SAME

(76) Inventors: John D. McLemore, 105 Hickory Ct., Fortson, GA (US) 31906; Don McLemore, 450 Brown Ave., Columbus, GA (US) 31906

( * ) Notice: Subject to any disclaimer, the term of this patent is extended or adjusted under 35 U.S.C. 154(b) by 64 days.

(21) Appl. No.: 10/187,440

(22) Filed: Jul. 2, 2002

(65) Prior Publication Data

US 2003/0005828 A1 Jan. 9, 2003

Related U.S. Application Data

(60) Provisional application No. 60/302,357, filed on Jul. 3, 2001.

(51) Int. Cl.$^7$ ................................................. A47J 37/04
(52) U.S. Cl. ........................... 99/421 V; 99/416; 99/418
(58) Field of Search ........................... 99/416, 418, 415, 99/419, 421 V, 431

(56) References Cited

U.S. PATENT DOCUMENTS

| | | | | |
|---|---|---|---|---|
| 536,986 A | * | 4/1895 | Dunlap | 99/409 |
| 1,969,601 A | * | 8/1934 | Foch | 99/419 |
| 2,052,505 A | * | 8/1936 | Vetrosky | 99/419 |
| 2,404,166 A | | 7/1946 | Danilla | |
| 2,587,133 A | | 2/1952 | Finizie | |
| 3,053,169 A | | 9/1962 | Rappaport | |
| 3,221,638 A | | 12/1965 | Wickenberg | |
| 3,583,307 A | | 6/1971 | Lee, Sr. | |
| 3,598,611 A | | 8/1971 | Swetlitz | |
| 3,817,164 A | | 6/1974 | Hintze | |
| 4,027,583 A | | 6/1977 | Spanek et al. | |
| 4,200,040 A | | 4/1980 | MacRae | |
| 4,258,617 A | | 3/1981 | Akwei | |
| 4,338,912 A | | 7/1982 | Gaskins | |
| 4,380,190 A | | 4/1983 | Adamis | |
| 4,590,848 A | | 5/1986 | Willingham | |
| 4,619,190 A | | 10/1986 | Smith | |
| 4,735,135 A | | 4/1988 | Walker | |
| 4,745,968 A | | 5/1988 | Demos | |

(List continued on next page.)

FOREIGN PATENT DOCUMENTS

| | | |
|---|---|---|
| CH | 544 535 | 2/1932 |
| EP | 0 786 224 | 7/1997 |

*Primary Examiner*—Reginald L. Alexander
(74) *Attorney, Agent, or Firm*—Smith, Gambrell & Russell, LLP

(57) ABSTRACT

A cooking rack for deep frying which includes a base, such as one formed of a plurality of spoke extensions, and a plurality of prongs extending up from the base. The rack further includes a lifting extension which is supported by the base such as by way of one or more foot extensions extending from a vertical main bar to the base. The lifting extension extends up from the base at a location that is radially spaced from a center of the base and preferably has a grasping loop. An embodiment of the invention features protrusions provided on the prongs for differentiating tipper and lower prong food positions and an additional embodiment features a grill that can be slid down into a resting position on the protrusions and with or essentially with a no horizontal slide (less than an inch horizontal slide capability). An embodiment also features a second grill which forms or is connected to the base, which base preferably features spoke extensions either radially extending from a central region of the base or represented by overlapping diametrical elongated base bars having the prongs integrally (e.g., an upward bend to form a prong from a horizontal base extension) related to the base extensions. A cooking apparatus with the rack and a cooking container and a grasping hook is also featured as well as a method of providing a cooking apparatus.

41 Claims, 7 Drawing Sheets

U.S. PATENT DOCUMENTS

| | | |
|---|---|---|
| 4,781,109 A | 11/1988 | Wiebe, Jr. et al. |
| 4,887,523 A | 12/1989 | Murphy et al. |
| 4,924,768 A | 5/1990 | Jay |
| 5,025,715 A | 6/1991 | Sir |
| 5,081,916 A | 1/1992 | Kuhling et al. |
| 5,106,642 A | 4/1992 | Ciofalo |
| 5,685,217 A * | 11/1997 | Kreitzer ...................... 99/419 |
| 5,813,321 A | 9/1998 | Bourgeois |
| 5,845,563 A | 12/1998 | Haring et al. |
| 5,896,810 A | 4/1999 | Barbour |

* cited by examiner

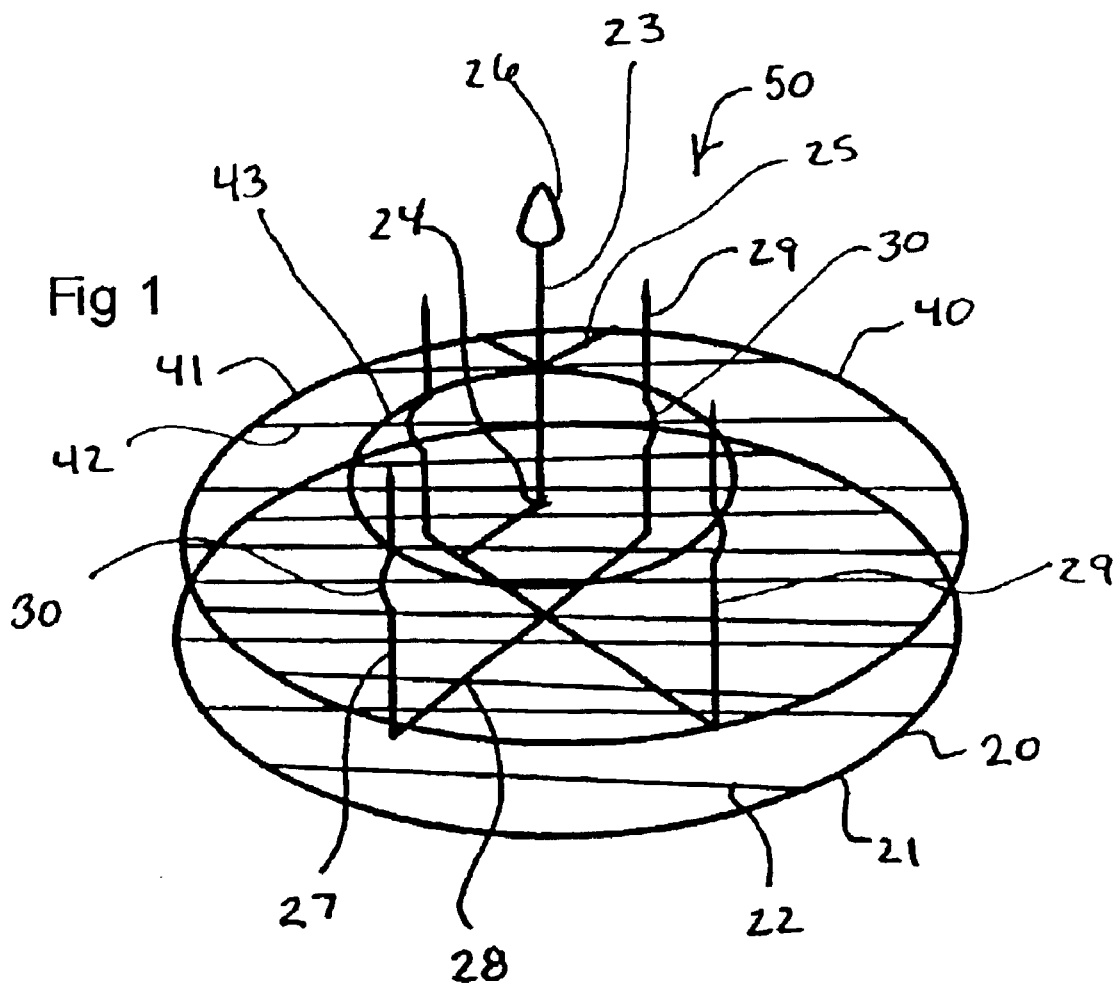

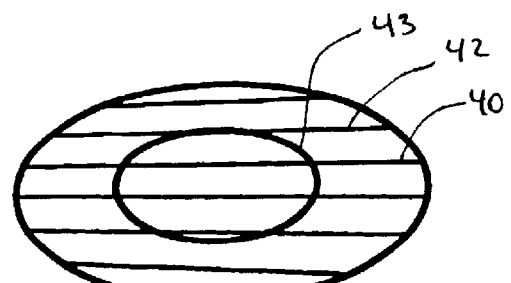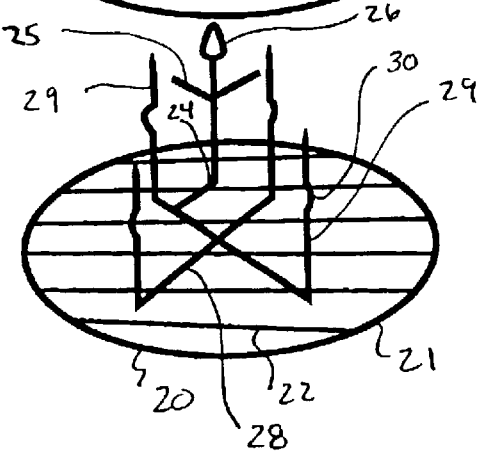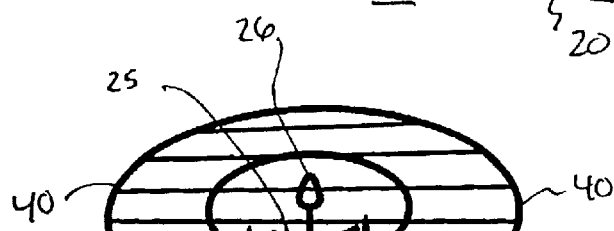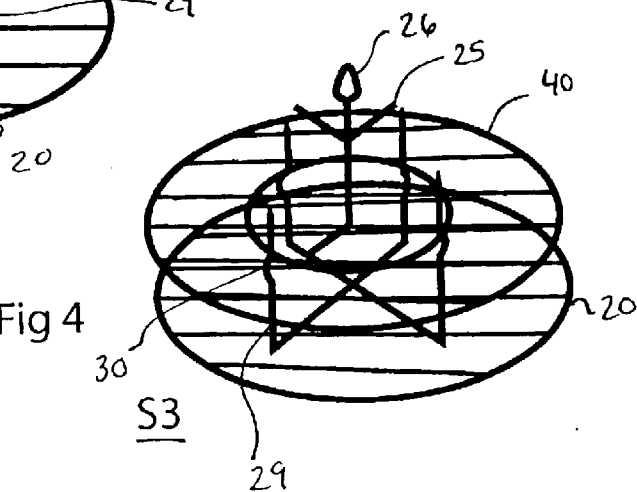

RACK DEVICE WELL SUITED FOR USE WITH A DEEP FRYING APPARATUS AND METHOD OF USING THE SAME

This application claims priority under 35 U.S.C. 119(e) to U.S. provisional application No. 60/302,357 filed on Jul. 3, 2001 which is incorporated herein by reference in its entirety.

FIELD OF THE INVENTION

The present invention is directed at a rack device particularly well suited for outdoor deep frying of meat, poultry, fish or other deep fryable food products. For example, the invention is well suited for deep frying of a plurality of cuts of meat such as steaks or pork chops, deep frying smaller poultry items such as Cornish Hens, deep frying seafood such as fish filets, or deep frying vegetables or the like. The present invention is also directed at a frying apparatus which includes a deep fry container(s) and the rack device in combination as well as a method of using the rack device and the frying apparatus with the rack device.

SUMMARY OF THE INVENTION

The present invention is directed at a frying apparatus which comprises a rack device that is particularly well suited for the deep frying of more than one meat, poultry, fish item or similarly sized food item in oil or the like at the same time. Further the present invention is directed at a frying apparatus that features a rack device that provides for deep frying a variety of items while maintaining desired relative spacing both amongst the items being cooked and the container of the frying apparatus which receives the rack device (preferably a deep fry basket which is received in a deep fry pot which receives the oil or directly in the deep fry pot). One preferred embodiment of the rack device of the present invention is in the form of a two grill rack device assembly (preferably each grill being comprised of round wire grill with each having crossing food supports, such as horizontal, parallel crossing wires) and a food support rack. The food support rack is preferably releasably or fixedly attached or positioned relative to a first (preferably lower in use) grill such that a plurality of food support prongs of the food support rack extend up away from the first grill. In a preferred embodiment the food support rack is supported or attached to the lower grill (e.g., welded to the crossing supports thereof). While a preferred embodiment features a rack support with its own base section, the lower grill can also provide, in and of itself, the base for the food support rack.

The food support rack has prongs that have a vertical extension component (preferably vertical, e.g. a vertical rise extension greater than its run extension or a true vertical, transverse to the supporting grill relationship) onto which a meat, poultry, fish or other food product can be fastened or skewered onto each prong. Each prong preferably has an intermediate protrusion such as an integral curved bend that curves out away from the main axis of the prong and preferably toward the periphery of the device. This intermediate protrusion can function both as a food blockage member and food support member when desired (e.g., slipping a first steak cut past and below the protrusion by way of extra force application and letting a second steak cut rest on or, more preferably, above the limiting upper surface of the protrusion) and also serves to support the upper grill when an upper grill is used (e.g., passing the prongs through openings in the grill and threading the grill down into supporting contact with the protrusions which are preferably equally located in a common intermediate area of the prongs such as a 25% to 75% range of the total height of the prong. The lower grill and/or fluid support rack also has a lifting extension which is attached radially outward of a central axis of the food support rack and preferably radially outward of a periphery contacting each of the prongs. For example, the lifting extension is preferably positioned radially within an annular ring formed between the periphery contacting each of the prongs and the grill's outer ring or even more radially external to the outer ring of the grill rack (e.g. the annular ring representing the 50% to 100% radius range of the grill and 100% to 135% representing the outward of the grill ring radius range) with the food support rack preferably being connected or made as one unit with the lower grill. The lifting extension is preferably external to the periphery defined by the prongs which are preferably three or more in number with four equally spaced prongs being preferred. The lifting extension is provided to provide a grasping component with which the rack device can be pulled out from a container and is of a sufficient height to clear, for example, the upper level of a body of oil in a cooking pot. Preferably the lifting extension is in the form of a vertical bar that has a loop portion at its free end (to facilitate lifting hook engagement) and a wing extension that is positioned intermediate of the lifting extension. The wing extension is preferably positioned on the lifting section at a common intermediate position as the above noted prong protrusion such that it functions as an underlying grill support member with the protrusion thereby stabilizing the upper grill when utilized with the rack or for added direct food support such as an end of steak support in association with two prongs through a steak cut. With this arrangement the lifting extension is preferably positioned within 5% outward and 25% inward of the radius of the outer grill ring so as to enable the wing extensions to be positioned for contact with either food cuts or an upper grill. The wing extension preferably comprises a bar or bars extending to opposite sides of the lifting extension so as to contact the upper grill to opposite sides of the lifting extension.

In a preferred embodiment, the upper grill additionally has a round centrally located ring which contacts the curve bend portions on the prongs of the food support rack (e.g., the inner ring has a circumference which matches that defined by the protrusions upper support surface). In a preferred embodiment the protrusions extend radially outward relative to the prongs such that the grill ring passes externally around the prongs. This arrangement places the prongs in contact with the interior of the ring so as to provide a stable arrangement with no horizontal sliding (due to prong/ring contact in a horizontal plane) and no vertical sliding due to the protrusion/ring engagement (preferably with the assistance of the wing extension underlying support). An alternate arrangement features the prongs arranged to have a greater circumference (but still a sliding arrangement) relative to the inner ring for horizontal stabilization in which case inwardly extending protrusions can be provided. Alternatively, an arrangement can be made wherein rather than an inner ring, the protrusion can contact linear section of the upper grill (e.g. the main grill bars or linear, transverse stabilizer bars.

The device is particularly suited for deep frying meat products outdoors in conjunction with an outdoor gas burner which supports a deep fry pot and depending on its size an additional deep-fry basket may be utilized as part of the frying apparatus or kit to support the rack device at a level above or on the floor of the pot. In a preferred embodiment the rack device is permanently fixed to a lower grill and the use of the upper grill is optional depending upon the intended use. For example, if there is a desire to deep fry steaks and/or chops the bottom rack can be utilized to support one or more steaks (with the steaks contacting or more preferably lifted, slightly above the lower grill's upper surface but below the protrusions in a generally horizontal arrangement and either in a sandwich relationship with a later positioned upper grill or, more preferably, in a spaced above end below relationship relative to the lower and upper grills, respectively (for improved cooking fluid contact on all exposed surfaces of the food item). Alternatively, the food piece is placed in a one, two or more prong skewer relationship with the racks prongs with or without an above positioned grill. Additional steaks, pork chops or other food items can then be supported on the upper portion of the prongs without an added upper grill (pieces placed above and in contact with the protrusions or more preferably suspended thereabove, and either in a vertical orientation with one prong extending through one or a plurality of serially arranged food pieces or in a horizontal relationship with either one prong extending through or more preferably two prongs extending through different sections of the generally horizontally arranged pieces). More preferably when dealing with steaks and the like, a first set of food items are placed on the prongs and then the upper grill is slid in position as described above and a second set of food pieces are arranged on the prongs either vertically or horizontally as described above and preferably spaced above the upper surface of the upper grill. Thus, while the food piece can be placed in contact with the upper grill, it is more preferable, based on prong friction, to suspend the food pieces above the upper grill rack to help facilitate overall oil passage (with the upper providing a slip down grill protection feature which could still provide relatively good oil/food surface contact which would be lessened in a food to food contact situation). Also the food pieces, when in position on the upper grill, help to lock the grill in position, although additional means such as a double protrusion arrangement featuring a smaller-relatively easier slide over protrusion above a larger support protrusion space there below are also representative of the present invention. The spacing between the upper and lower grills can be chosen to suit the intended need of a customer. For example, if food pieces that are not readily suited for prong insertion, the grills can be placed at a spacing to sandwich those non-pronged pieces to maintain them in position during the turbulence of the cooking medium. Thus the rack can be used in this non-prong food fashion, or only in a prong food support fashion or a combination of the two techniques with the same or different food pieces. Various levels of multiple protrusions for a single prong can also be provided through use of compressible protrusions, although a relatively rigid single protrusion per prong is preferable.

Alternatively the rack device can embody the lower grill and rack free of the upper grill. This represents an embodiment well suited for deep frying smaller poultry such as Cornish Hens which the prongs can penetrate into to hold the pieces in position during cooking.

The preferred arrangement for the rack device, and one well suited for use in deep frying in oil, features four prongs that have a common base either defined by the grill or more preferably an interconnected base extension such as pair of joined together base extension support bars. In a preferred embodiment the rack device features two rack sections each comprised of two diametrically opposed prongs with a common diametrically extending base extension with the extension of one fixed to the other such as by welding at an overlap location preferably with a recess provided in one in the area of overlap to keep the remainder of the base extensions at a common level. Also the diameter defined by interconnecting points of the prongs at the level of the lower grill is preferably concentrically arranged with regard to a preferred circular lower grill and at an intermediate location (e.g. a radial location at 25 to 75% of the full radius of the lower grill and more preferably about 40 to 60% of that radius and even more preferably 50%). The lifting extension is preferably welded or otherwise permanently fixed to the based section at a location which is preferably relatively close to the central point of the base section (e.g., a lifting extension inward contact point within one to two inches of the base section with a lifting extension base the extends radially outward to position a vertical bar of the lifting extension at the above noted grasping hook radially external hook location.

The prongs are preferably sized so as to sufficiently penetrate a wide assortment of food piece sizes (e.g. a 1 to 5 inch height is well suited for this purpose with a 3 to 4 inch range preferred). The lifting extension with a preferred integral grasp loop included preferably extends higher than the preferably sharpened free ends of the prongs (e.g., a 5 inch height). The base extensions are preferably about 6 inches in length and criss-crossed in a transverse arrangement with equal spoke lengths. The grills are preferably formed with a larger outer radius than a circumference contacting the prongs.

In use, the pieces to be cooked are supported on one of the above noted variations of the rack device in one of the above noted variations for supporting the pieces on the rack and/or rack and grill assembly and placed in the pot either alone or in conjunction with a basket as described above. In the pot there is provided a suitable cooking medium such as oil at a level preferably sufficient to completely immerse the pieces when the rack is in position. The cooking medium is used to cook the pieces and when cooking is complete a grasping hook or the like is used to engage the lifting extension whereupon an upward lifting force is used to remove the rack device from the frying apparatus. In one embodiment, the cooking basket is provided with capture means such as a side wall hook which can be connected to the pan's upper rim to hold the cooking basket above the oil level. This can therefore provide, for example, for the removal of the rack device directly out of the container(s) or indirectly by first removing or lifting up a basket (and preferably attaching to the side of the pot through use of a hook assembly) to be free of the cooking medium and then removing the rack device from the basket. In either situation, the peripheral arrangement of the lifting extension enables a user to incline the rack device prior to complete removal to allow for cooking medium drip off at a location where vaporized cooking medium is likely not to be the most prominent. This tilting is facilitated by using a grasping hook/loop combination relative to grasp handle and lifting extension. Thus, tilting of the rack device in combination with an earlier hooking of a basket to the top edge of the pot for drainage purposes, facilitates a rapid and extensive drain off of oil off the food. For example, the basket with rack device supported on its base is first lifted partially out of the pan and hooked into position to achieve a drainage of the oil on the rack, food products, and basket (with drain holes, for example). Thereafter, the rack can be partly withdrawn from the basket and lifted relative to the pot so as to assume a tilted position where additional oil drains off prior to moving to a food preparation surface.

A second preferred embodiment of the rack device of the present invention is one which is free of the above noted upper and lower grills. This alternate embodiment comprises the rack alone with reliance placed on the criss-crossing base extensions (or alternate base structure) for pot or basket contact and features a peripherally arranged lifting extension (e.g., a lifting extension that vertically extends upward from a point on a horizontal plane that is commensurate with a circumferential circle that connects the base of the vertical prongs or is either further radially out from that interconnecting circle). As above, this peripheral arrangement achieves the drain off advantage described above in that the pronged or otherwise held in place food pieces are inherently tilted during lift up on the lifting extension with, for example, a grasping hook.

BRIEF DESCRIPTION OF DRAWINGS

The invention will be better understood from a reading of the following detailed descriptions of embodiments of the invention taken in conjunction with the drawings in which:

FIG. 1 shows a rack device of the present invention with both a lower and upper grill in operating position.

FIG. 2 shows the arrangement of FIG. 1 prior to complete assembly with the top grill ready to be slid down for snapping or contact with the protrusions of the prongs;

FIG. 3 shows the top grill being aligned and being slid past the upstanding prongs for sliding into final position;

FIG. 4 shows the placement of the upper grill in supporting contact with the protrusions of the prongs to place both grills in a stacked relationship;

DETAILED DESCRIPTION OF THE PREFERRED EMBODIMENTS

Figure 5:
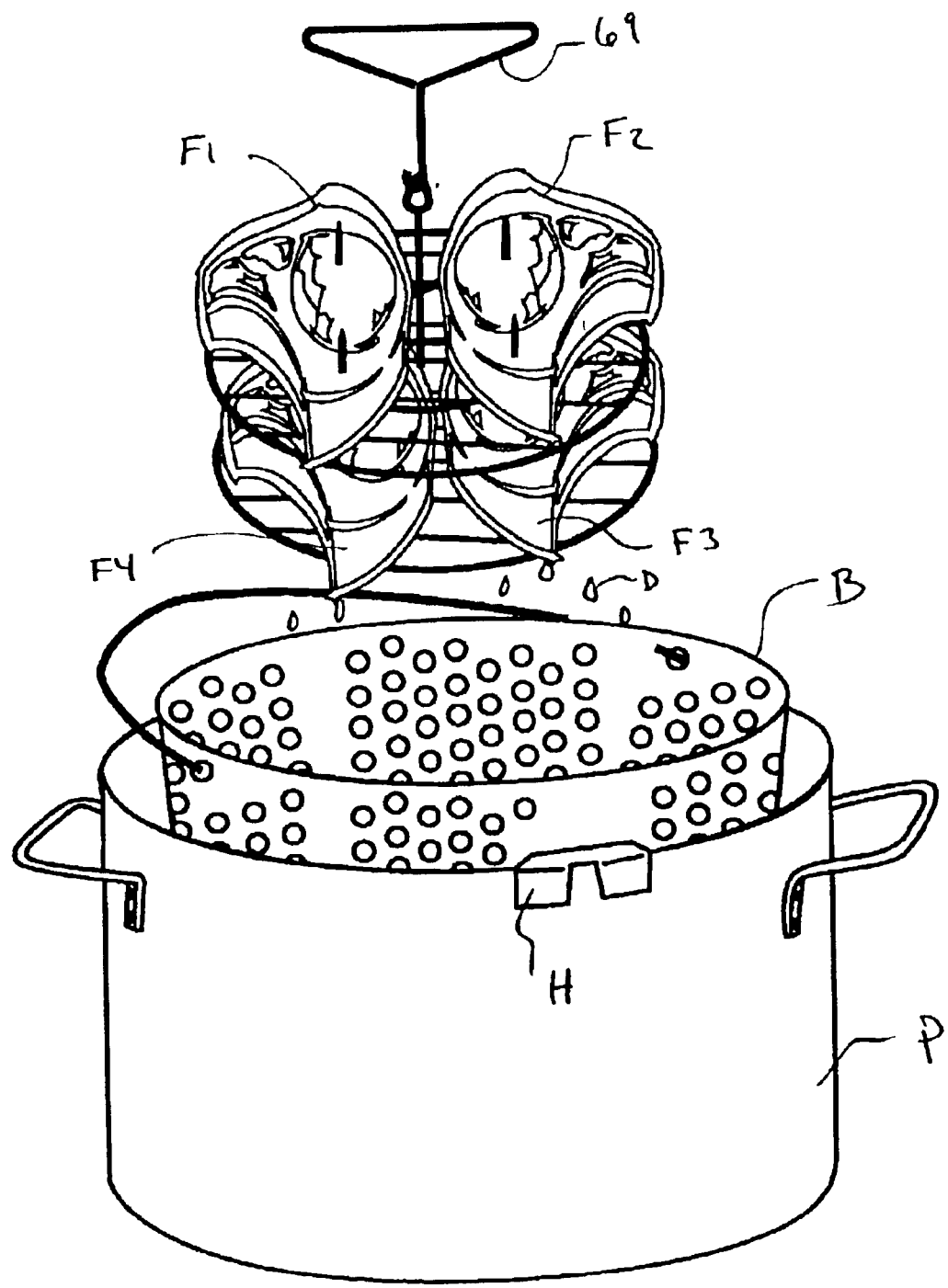
FIG. 5 shows the rack of FIG. 1 being used for deep frying steaks in association with a hookable drain basket and covering pot.

As shown if FIGS. 1–6, a first preferred embodiment of rack device 50 for deep-frying meats, poultry, fish, vegetables (e.g. deep fried onions) or similar sized food products comprises an upper grill 40, a lower grill 20 and a food support rack 27.

The lower grill 20 has crossing supports 22 and an outer rim 21 (circular in this embodiment). The crossing supports 22 can be made of stiff metal wires or bars and are preferably parallel to each other. The outer rim 21 can also be made of a stiff metal wire or bar and can serve to give the lower grill 20 a rounded shape and the ends of the grill bars or wire are welded thereto. The lower grill 20 is preferably free of any circular rings other than its outer peripheral ring 21. The lower grill 20 supports food support rack 27 which has an attach portion or base structure 28 that is preferably attached to the crossing supports 22 of the lower grill 20. The food support rack 27 has vertically extending prongs 29 onto which meat, poultry, fish or a similar sized food product can be fastened or skewered onto each prong 29 or one or sets of prongs. Each prong 29 has a protrusion 30 such as the illustrated integral curved bend portion that preferably curves out toward the periphery of the device and which serves to support the upper grill 40 when the upper grill 40 is used. The lower grill 20 also has a lifting extension 23 which has an end 24 that is attached (e.g. welded) to the outer rim 21 of the lower grill 20. The lifting extension 23 allows the user to lower and raise the device through use of a grasping hook or the like as described above. The lifting rod 23 has a grasping device such as a generally circular loop (e.g. a tear drop shaped loop with curved base tapering to a constricted top hook contact section 26 to which a lifting hook (FIG. 7) can be inserted for raising and lowering the device. The lifting rod 23 also has a "V" shaped support or wing extensions 25 attached about its middle region (e.g., a common height with protrusions) which also serves to support the upper grill 40 when the upper grill 40 is used.

The upper grill 40 has crossing supports 42 and an outer rim 41. The crossing supports 42 can be made of stiff metal wires or rods as described above for lower grill 20 and are preferably parallel to each other across the entire area defined by the outer rim or ring 41. The spacing is arranged to preclude food falling through (e.g. following slippage from a preferred space relationship relative to the grills) while allowing full cooking medium flow through and thus other arrangements achieving these functions can also be utilized. The outer rim 41 can also be made of a stiff metal wire or bent rod as above and can serve to give the lower grill 40 a rounded shape (preferably each outer ring of the same diameter). The upper grill 40 also has a round centrally located ring 43, or some other means of protrusion support contact, which is concentrically arranged internal of the outer ring 41 preferably at a 30% to 80% radius location such as the half way point of rings 41's radius. Inner ring 43 is arranged to come in contact with the protrusions (curved bend portions in this embodiment) 30 of the prongs 29 on the lower grill. The wing extension(s), when utilized, also preferably are positioned for upper grill support contact with the contact between the wing extensions and grill preferably being based on extreme free ends of the wing extension in underlying grill contact as with wing extensions falling on a vertical plane. More preferably, the wing extensions can be inclined radially outward to provide contact along an end portion of the wing extensions and the extreme ends extending external to the grill 40 outer rim. This facilitates proper centering during assembly by directing an offset grill 40 radially inward to a center location during assembly. The diameter of ring 43 is such that there is preferably a minor radius tolerance when the upper grill is horizontal (e.g., a frictional slide contact relationship) relative to the prongs above the protrusions to help maintain the upper grill from shifting in use. As noted, for additional stability the "V" shaped wing extension support 25 of the lifting extension 23 is at a common support height with protrusions 30.

Upper grill 40 can be easily slid into and out of position relative to rack 29 and lower grill 20. It can thus easily be utilized or not during a cooking operation with the type of food pieces (similar or a mix of different types) being typically controlling as to which arrangement (with or without upper grill) is preferable. FIG. 5 illustrates an example where a plurality of cuts of meat (e.g. four steaks F1 to F4) are provided on each of the prongs vertically upper of the upper grill and with some being held in position with the prongs between the upper and lower grills).

Cuts F1 to F4 are sized such that each cut has two prongs extending therethrough. The thickness and width of the preferably flat bar prongs 29 is preferably such that the steaks can be suspended above the respective upper and lower grills. In this way, cooking fluid flow is able to reach all exposed surfaces of the food product. Pairs of prongs are preferably spaced apart so as to be able to extend through most steak cuts. If slippage were to occur, the upper grill with its spacer bars would support the food product while still allowing large surface contact (as opposed to two steaks sliding into direct contact due to slippage. FIG. 5 also illustrates how the horizontal in use upper and lower grills assume an oblique relationship upon being lifting up by an operation hooking loop 26 with a grasping device such as grasping hook 69. In this way, cooking fluid is free to run off the typically planar upper surface of food cuts F1–F4 and drip off as represented by drops D. In a preferred embodiment, rack 50 is sized for receipt within an interior container such as basket B with flow through holes over its side and bottom. Thus, upon lifting extension 23 with a grab hook (with the rim 41 and the lifting extension 23 being just inward such as within one inch, more preferably within a half inch, of the reception container's B inner periphery or a pot if an interior container is not being used at the above range or twice the above range) the food product draining can be initialed after the basket B has earlier been lifted out of Pot P and suspended via basket hook H on the side(s) of the basket. The container in FIG. 5 is preferably a basket with its own pot lift out handle (preferably one also that can be grasped with the hook used to lift the rack device). With the rack arrangement of the present invention featuring the offset lifting extension, the user's hands holding the hook is removed to some degree from the interior of the pot where the majority of the vapors raise up and provides automatic drainage in sequence (drippings are released bit-by-bit) as the rack is being lifted up such that a large extent of the drippings are released before the rack is lifted completely out from the cooking apparatus.

Figure 6:
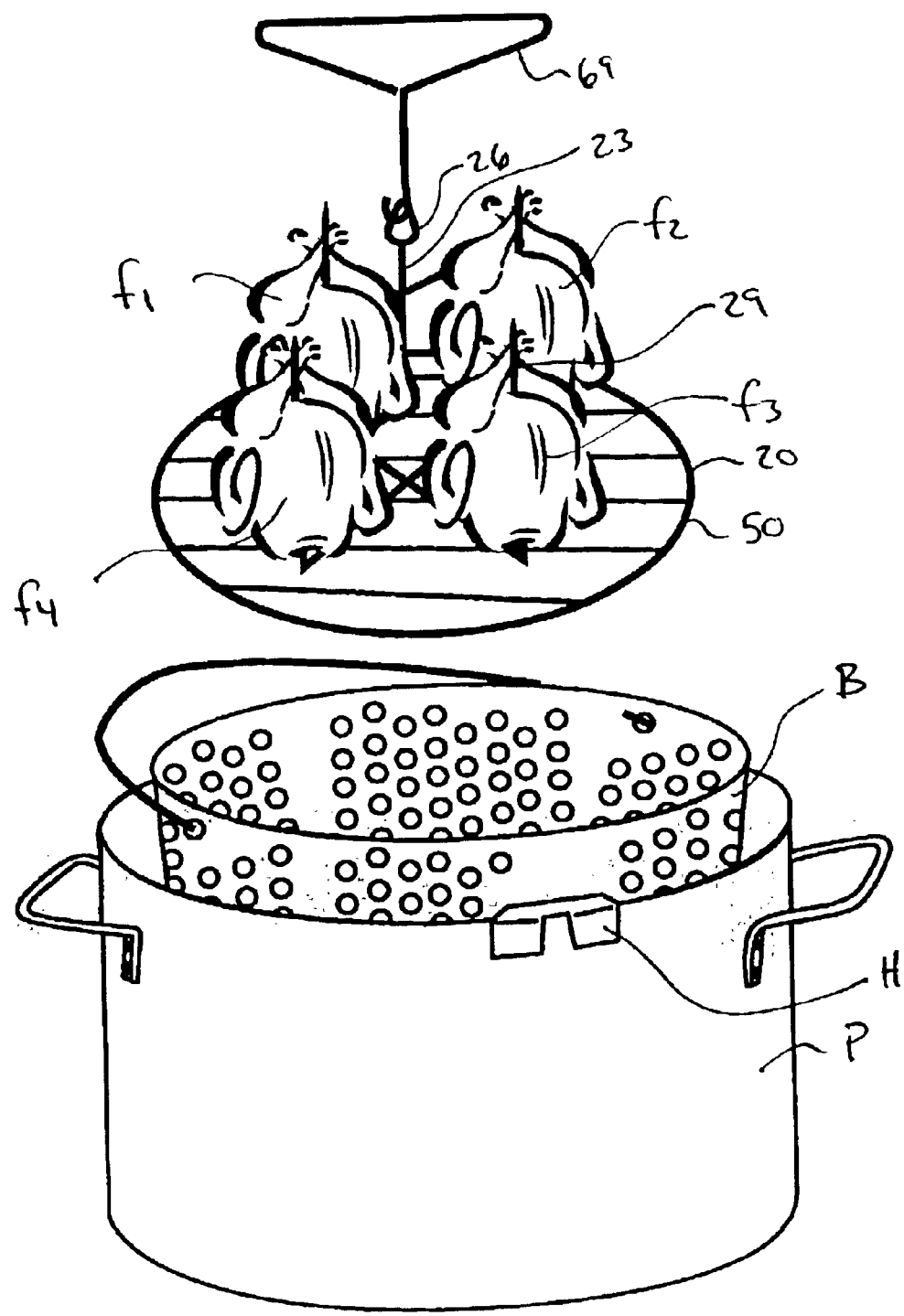
FIG. 6 shows an alternate embodiment of the rack device which is free of the upper grill being used to cook Cornish Hens in association with a hookable drain basket and covering pot.

FIG. 6 shows an alternate embodiment wherein the food pieces f1–f4 are of a type where it is more preferable not to use the upper grill, just the integrated lower grill and rack. For example, when deep-frying poultry, such as the Cornish Hens shown in FIG. 6, one Cornish Hen can be attached to each prongs 29 of the lower grill 20 with the bottom of the hens preferably suspended (e.g., with the assistance of a prong protrusion) or provided resting on the grill 20. The device 50 is then lowered by the lifting device 23 into oil for deep-frying for an appropriate amount of time or into a basket B either prior to or after the basket is placed into the cooking medium. When the Cornish Hens are adequately fried, the device 50 is then removed from the oil via the lifting extension 23. When deep-frying Cornish Hens, it is not necessary to use the upper grill 40. Thus, the frying apparatus can take on the form of a double grill rack device with oil medium supporting pot or container and with or without a perforated basket as shown in FIG. 5 or one having the same components only free of the upper grill as shown in FIG. 6 (or free of any grills as described below). Various food positioning alternatives are also possible such as placing steak cuts or the like vertically oriented and cooking as a group or in combination with some of hens f1–f4.

Thus, when deep-frying meats, such as steak or chops, one or more steaks, depending on size, can be skewered or attached to individual or groups of prongs 29 of the lower grill 20 below the curved bend 30 of the prong 29. The upper grill 40 is then set into place above the lower grill 20 and steaks and resting on the curved bends 30 of the prongs 29. More steaks can then be attached to the prongs 29 above the upper grill 40 preferably positioned so as to be suspended above the upper grill. The device 50 is then lowered into oil by the lifting extension in combination with the hook for deep-frying for an appropriate amount of time.

FIGS. 2 to 4 illustrate a rack (with two grills) assembly sequence S1 to S3 where the lower grill 20 is one which is secured such as by welding to base extension 28 of food support rack 29 which is centered relative to the grill and provides a very stable underlying support surface when the combination of food support rack and lower grill is placed on a flat surface with prongs 29 standing up. The user then aligns the diameters of the upper and lower grills and as shown in step S1 and slips the upper grill 40 vertically along the prongs as shown in step S2 until interior rim 43 makes contact in supporting fashion with the protrusions (step S3). The outer rim 41 of the upper grill also preferably makes (e.g. simultaneous or post protrusion contact) contact with wing extension(s) 25.

As shown if FIGS. 7 to 10, an additional preferred embodiment of a rack device (60) for deep-frying meats, poultry, fish (or other sea food) or similar sized food products does not employ the use of an upper and/or lower rack. This additional embodiment comprises prongs 61, each prong 61 having a bottom joined (preferably of one piece) with the base of the food support rack such as a horizontal base portion like the radial outer end of the illustrated base extension spoke 62. The base extensions 62 of the prongs 61 are attached to each other preferably at a central portion 63 of the base with the base comprised of, for example, diametrical criss-crossing base extensions 62 or integrally formed base extension extending radially out as in a monolithic spoke arrangement. When diametrical base extensions 62 are utilized, they are preferably two crossed over lengths of bar with each bar having an upstanding prong on its ends. The prongs 61 define vertical portions 64 with preferably spiked free ends to which meat, poultry, fish or similar size food product can be attached to each. The vertical portions 64 of the prongs 61 each have a protrusion (e.g., curved section) 65 which can serve to separate or maintain the separation, despite slippage, relative to two food items vertically stacked such as pieces of meat when more than one piece of meat is attached to each vertical portion 64 of the prongs 61. A lifting extension 66 is attached by way of an L-shaped base member 14 (at a common horizontal height as the base extensions 62) which has a first leg 15 connected (e.g., welded) to one of the base extension spokes 62 at an interior or intermediate location and a second leg which extends out preferably sufficiently to extend at or beyond a circumferential ring extending through the base level of each prong (such that the tilting function is readily achieved). As in the above embodiment wing extension 67 (in this embodiment horizontally extending out and formed of a single bar extending to opposite sides of the main lifting extension bar and joined by welding, for example) are attached to the lifting rod 66 at about the lifting rod's 66 middle portion. In this way, an upper grill rack or an end of a piece of meat arranged horizontally can be additionally supported so as to retain a horizontal orientation (and ensure no flap over of a large piece of steak into contact with a lower piece). The lifting extension 66 also has a circular end 68 into which a grasp hook 69 can be inserted for lifting and lowering the device 60 into a container such as pot P shown in FIG. 10.

Figure 7:
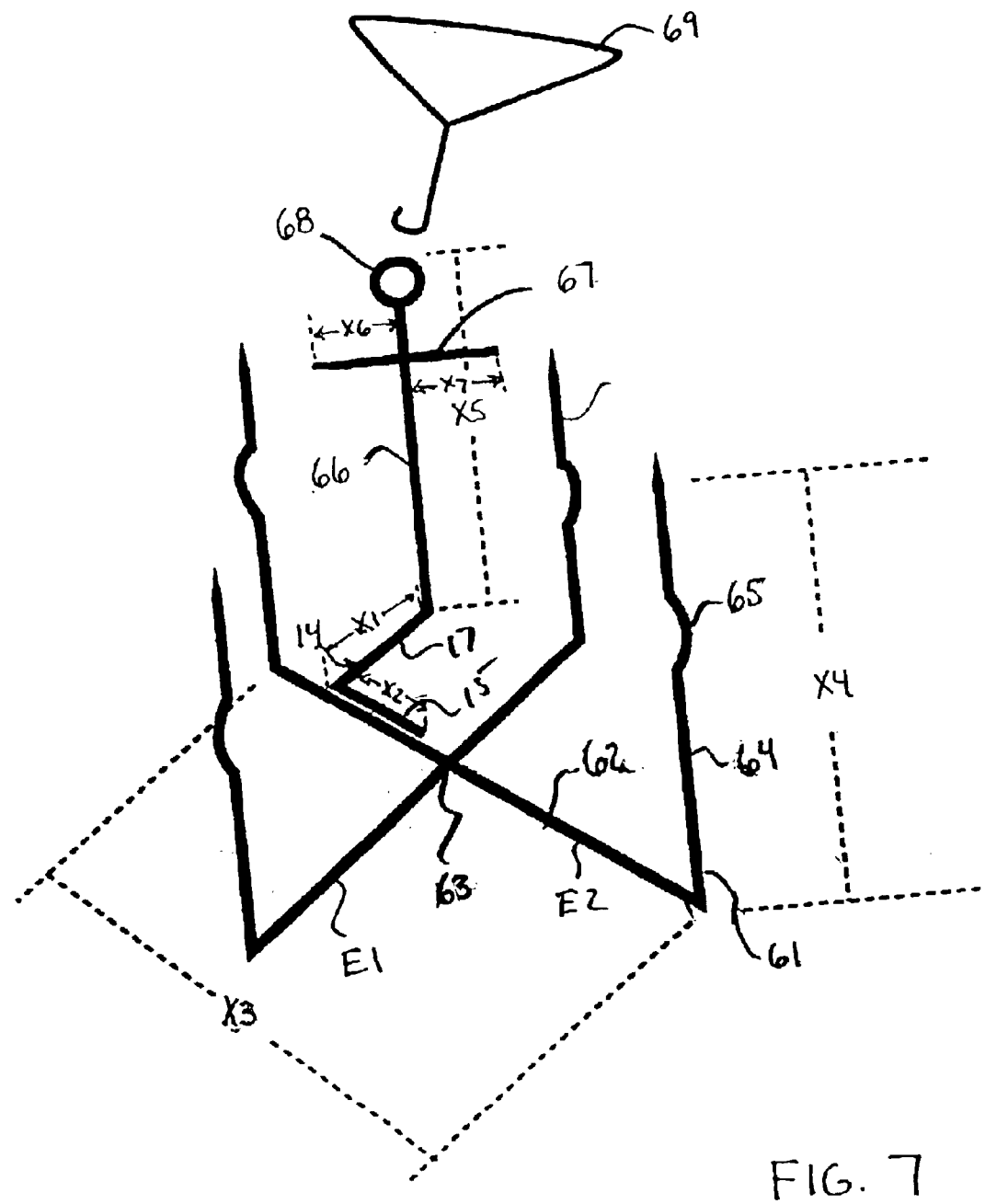
FIG. 7 shows another embodiment of the invention which is free of both the upper and lower grills and together with a grasping hook.

FIG. 7 further illustrates dimensional lines for distances X1 to X7 for various components of the embodiment of FIG. 7. In a preferred embodiment X1 and X2 are the same in value and preferably range from 0.5 of an inch to 4 inches with 2 inches being well suited for the preferred usage of the present application. Base portion 62 of the food rack device preferably comprises a spoke arrangement extending out from center point 63 either in the form of four base assembly spoke bars or extensions all joined at the center or, more preferably, two overlaid elongated base sections E1 and E2 representing two diametrically extending spoke sections and with each elongated base section having a prong at each end. Dimension X3 is representative of an elongated base section with each of the elongated base sections preferably being of a common dimension with one or both having a recess at center point 63 to have the elongated base sections lying on a common horizontal plane when overlapped/attached, but for the recess(es) to receive the other overlying elongated base section. A four spoke or two elongated base section arrangement is preferred, but lesser (e.g., preferably at least 3 equally spaced spokes for stability or two with a lower grill support) or more (e.g., 6 or 8 spokes or half the number of elongated base sections) is also a feature of the present invention, although the illustrated number works well for many typically sized food items intended for deep frying. A dimension of 4 inches to 12 inches is well suited for dimension X3 representing the length of an elongated base section with the spoke length being preferably generally half thereof.

Figure 8:
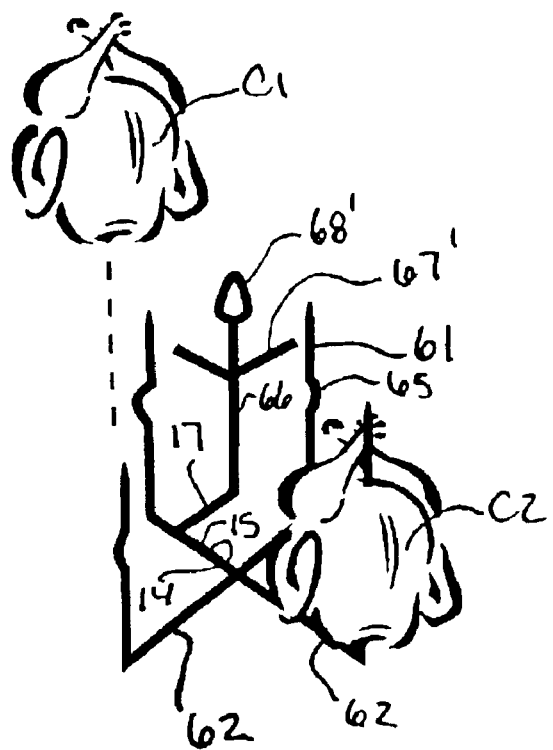
FIG. 8 shows the rack device of FIG. 7 with small poultry pieces being individually placed on individual prongs.
Figure 9:
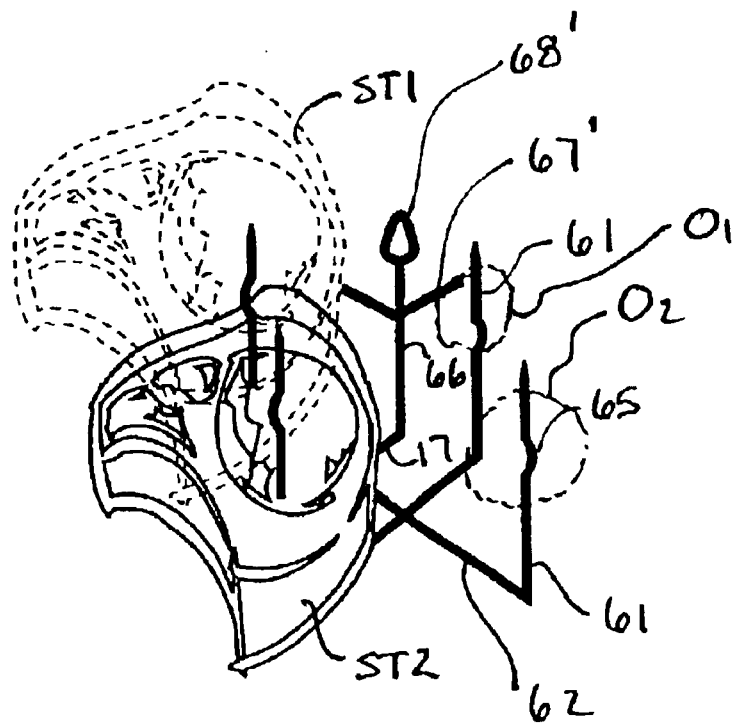
FIG. 9 shows the device of FIG. 7 being used to cook steaks with a first being double pronged and placed below the protrusions and a second piece being also double pronged and suspended above the protrusions.

Dimension X4 illustrates the total prong height from the base section to the free end (preferably a relatively sharp edge—such as a flat bar prong with a tapering free end that tapers within a range of 30 to 60 degrees with an end point that is slightly rounded or blunted for easier operator handling). A preferred range for X4 is 2 to 12 inches with a 4 inch length being well suited for reception of the thickness/height of most intended food types such as two steaks while leaving suitable oil flow clearance between each cut. The 4 inch height also is well suited for extending into (retained internally of the poultry piece or extending through) most small poultry pieces. An example of each of the same can be seen in FIGS. 8 and 9 with FIG. 8 showing Cornish Hens C1 and C2 with one in a ready to fry position on a prong and a second aligned for insertion on a prong. The protrusions 65 (e.g., a ⅛ to ¾ inch extension horizontally off the vertical for a ½ to ¾ inch vertical segment of a prong, preferably at an intermediate 25% to 75% mid range location of the total height of the prong with a 50% position preferred) also help facilitate maintaining the Cornish Hen captured during the turbulence of cooking with boiling cooking fluid. FIGS. 8 and 9 also illustrate sloping wing extensions (67' either unitary or two piece with internal ends connected to the lifting extension) as well as the tear dropped loop 68' of the previously described embodiment. Dimension X5 is representative of the vertical height of the preferably vertical lifting extension (e.g., prongs and lifting extension are all preferably true vertical, although the present invention also features an umbrella embodiment, for example (not shown) wherein the prongs and/or lifting extension are in a diverge or converge relationship (e.g. within a 30 degree range). A range of 3 inches to 14 inches is preferred for X5 with it being preferred to have the lifting extension of a greater height than the prongs as shown in the figures such as by having the main bar of 4 inches like the prongs with a 1 inch loop height. Longer lengths may be desirable depending on the grasping hook configuration, for example, to help provide proper clearance relative to the heat and turbulence of the cooking fluid, but a 5 inch length provides sufficient clearance while maintaining good operator handling control. Wing extensions need to extend out sufficiently for providing the above noted grill and/or food support. A 0.5 to 4 inch length for each of X6 and X7 is suitable for most uses with individual lengths of 1 inch and 2 inches being preferred for each of X6 and X7. The prongs are all preferably of a common height, but the present invention also includes an embodiment where the prong lengths are varied (e.g., left set of one height and a right set at another height for combination situations such as a surf-and-turf arrangement with seafood on one set and steak(s) on another set.

FIG. 9 illustrates two steak cuts positioned with vertical spacing with the first (ST2) positioned vertically spaced from the elongated base sections 62 and vertically spaced from protrusion 65. The second steak (ST1) is illustrated in position on a pair of adjacent prongs as well with it being preferably spaced vertically above the protrusion 65 and preferably with the free end of the prong extending vertically above the upper surface of the steak cut ST1. Each of FIGS. 8 and 9 illustrate room for holding additional food pieces of the same or different type (e.g., a steak cut support arrangement as shown in FIG. 9 together with the illustrated onions O1 and O2).

Figure 10:
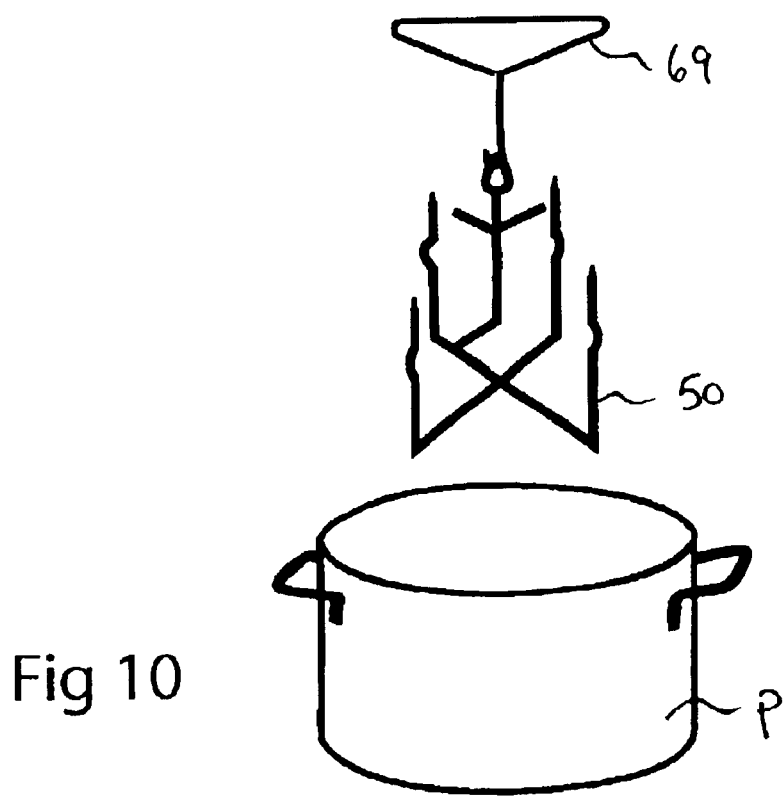
FIG. 10 shows the rack device of FIG. 7 being lowered into a pot of oil for deep-frying.

FIG. 10 shows a basket free relationship with the rack device 50 aligned for insertion into pan P by way of grasping hook 69. Because of the ability of the prongs (preferably with protrusions) to maintain the food pieces suspended vertically above the upper surface of the base (e.g. the pair of base extensions 62 which are preferably flat bars like the prongs with a width of less than 1 inch (e.g. ¼ inch to ½ inch—and a preferred height thickness of ⅛ inch to ½ inch)) there is no need to have the base extensions provided with legs or something different such as integrated wavy patterns, although such features can be added in an alternate embodiment of the invention (not shown).

Figure 11:
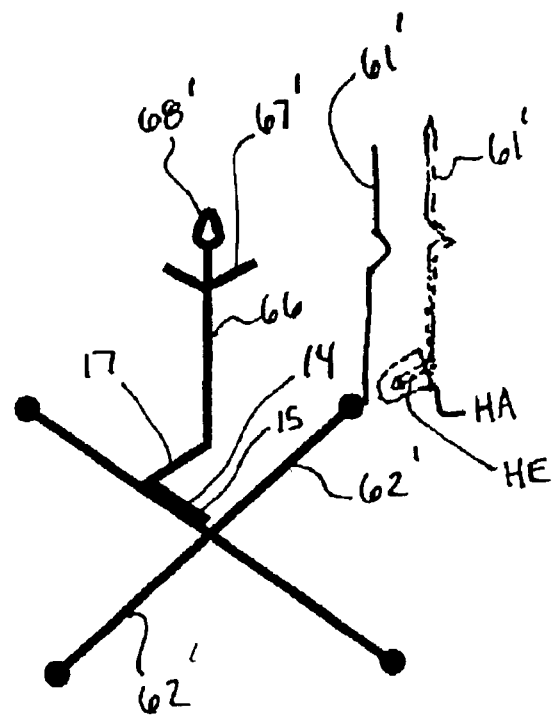
FIG. 11 shows an alternate embodiment of the invention featuring detachable prongs.

FIG. 11 shows an alternate embodiment of a rack device 50' of the present invention which is similar relative to the earlier described embodiment, but for having removable prongs 61' which have ends that are received by the ends of spokes 62'. Prongs are either frictionally maintained in cooking position (e.g., a frictional telescoping arrangement where a horizontal extension HE is either a female slide coupling such as a hollow reception port into which the flat bar of the base extension 62' extends into (or vice versa) or a key slot—tubular arrangement is provided on one or the other with a pin on one for sliding in a z-shaped slot, whereupon sliding, rotating and further sliding in together, a cooking position locking is achieved. After sufficient cooling the prongs can be separated in reverse fashion and a handle member (HA) with a common extension/recess as that of the free end of the spoke 62' is joinable to facilitate removal and transport to another location (in shish kabob fashion).

Appropriate conventional metals and other materials, which are suitable for deep-frying, can be used for producing the various components of both above described embodiments. These materials are well known to the skilled artisan.

Although the present invention has been described with reference to preferred embodiments, the invention is not limited to the details thereof. Various substitutions and modifications will occur to those of ordinary skill in the art, and all such substitutions and modifications are intended to fall within the spirit and scope of the present application.

What is claimed is:

1. A cooking rack for deep frying, comprising:

a base;

a plurality of prongs extending upward from said base, and said prongs including a protrusion; and a lifting extension which extends upward relative to said base and is supported by said base, wherein said lifting extension includes a bar extension and a foot extension with the foot extension extending from said base and positioning said bar extension radially outward from a central region of said base.

2. The rack as recited in claim 1 wherein each of said prongs include a protrusion positioned at an intermediate location relative to a vertical height of said prongs.

3. The rack as recited in claim 2 wherein there are at least three prongs circumferentially spaced apart.

4. The rack as recited in claim 2 wherein said base includes a plurality of spoke extensions extending out from a central region of said base and said prongs extending up off said spoke extensions.

5. The rack as recited in claim 4 wherein said prongs are connected with said spoke extensions and extend off respective radial outer ends of said spoke extensions.

6. The rack as recited in claim 5 wherein said prongs are integral with said spoke extensions.

7. The rack as recited in claim 5 wherein said prongs are releasably connected with said spoke extensions.

8. The rack as recited in claim 1 wherein said bar extension extends vertically up from a level of said base and said foot extension extends away from said base so as to position said bar extension radially outward from a periphery extending about a bottom end of each of said prongs.

9. The rack as recited in claim 8 wherein said base is comprised of a plurality of spoke extensions and said foot extension is connected to one of said spoke extensions.

10. The rack as recited in claim 9 wherein said foot extension includes a foot section which extends out transversely to said one of said spoke extensions.

11. The rack as recited in claim 1 wherein said lifting extension includes a main bar joined to said base and a capture member at an upper region of said main bar.

12. The rack as recited in claim 11 wherein said capture member includes a loop or hook segment defining a reception area for a grasping device.

13. The rack as recited in claim 1 wherein said protrusions extend radially outward from said prongs.

14. The rack as recited in claim 1 wherein said lifting extension has an upper end which is space higher off from said base than said prongs.

15. A cooking rack for deep frying, comprising:

a base;

a plurality of prongs extending upward from said base, and said prongs including a protrusion; and a lifting extension which extends upward relative to said base and is supported by said base, wherein said protrusions are formed by bends formed in said prongs to provide an above and a below food capture prong region relative to the bends formed in respective prongs.

16. A cooking rack for deep frying, comprising:

a base;

a plurality of prongs extending upward from said base, and said prongs including a protrusion; and a lifting extension which extends upward relative to said base and is supported by said base, wherein there are at least four prongs and said base is formed of a plurality of spoke extensions extending radially out from a central region of said base with said spoke extensions being defined by at least a pair of base extensions which are diametrical in dimension and overlap each other in the central region, and said prongs extending vertically up from respective ends of said overlapping base extensions.

17. A cooking rack for deep frying, comprising:

a base;

a plurality of prongs extending upward from said base, and said prongs including a protrusion;

a lifting extension which extends upward relative to said base and is supported by said base; and a first grill which has a supporting section which is configured for supporting contact with said protrusions and which is releasable relative to said prongs.

18. The rack as recited in claim 17 wherein the supporting section of said first grill comprises one or more grill bars positioned on said first grill for direct contact with said protrusions.

19. The rack as recited in claim 18 wherein said supporting section is a grill bar ring which is of a diameter which places said ring on said protrusions for support of said first grill relative to portions of said prongs extending above said first grill.

20. The rack as recited in claim 19 wherein said grill bar ring is radially spaced inward from an outer rim of said first grill.

21. The rack as recited in claim 17 further comprising a second grill, said second grill being secured to said base.

22. The rack as recited in claim 21 wherein said second grill is non-releasably secured to said base and said first grill has a diameter which is commensurate with a periphery extending about said prongs.

23. The rack as recited in claim 21 wherein said first and second grills are in a parallel relationship with said first grill being at a common intermediate location relative to said prongs which intermediate location is in a 40 to 60% range of height relative to a full height of said prongs.

24. A cooking rack for deep frying, comprising:

a base;

a plurality of prongs extending upward from said base, and said prongs including a protrusion; and a lifting extension which extends upward relative to said base and is supported by said base, wherein said prongs are flat bars and said protrusions are bends formed in said flat bars.

25. A cooking rack for deep frying, comprising:

a base;

a plurality of prongs extending upward from said base, and said prongs including a protrusion; and a lifting extension which extends upward relative to said base and is supported by said base, wherein said lifting extension includes a main bar and an intermediate wing extension which extends out away from said main bar.

26. The rack as recited in claim 25 wherein said wing extension extends to opposite sides of said main bar and is positioned such that a least a portion thereof is at a common vertical height as said protrusions.

27. A cooking rack for deep frying, comprising:

a base formed of a plurality of spoke extensions;

a plurality of prongs extending up from respective ends of said spoke extensions;

a lifting extension which is supported by said base and extends up from said base at a location that is radially spaced from a center of said base.

28. The rack as recited in claim 27 wherein said lifting extension includes a foot section and a main bar with said foot section joined with one of said spoke extensions and said main bar extending vertically up from an end region of said foot section.

29. The rack as recited in claim 27 wherein said lifting section includes a vertical bar section having a bottom region that is positioned radially outward from a periphery extending about said prongs.

30. The rack as recited in claim 27 wherein said lifting extension includes a grasping loop or hook section at an upper end region for facilitating the lifting of said rack with a grasping device.

31. The rack as recited in claim 27 wherein said prongs have intermediate protrusions extending radially.

32. The rack as recited in claim 31 further comprising a first grill which is slidingly received by said prongs and releasably supported above said base by said protrusions.

33. The rack as recited in claim 32 further comprising a second grill which is spaced below said first grill.

34. A cooking apparatus, comprising:

a rack, having a plurality of upstanding prongs, a first grill releasably supported by said prongs at an intermediate location of said prongs;

a lifting extension which is connected to said prongs and extends upward together with said prongs;

a second grill positioned below said first grill.

35. The cooking apparatus as recited in claim 34 further comprising a prong base to which said prongs are connected and said lifting extension being connected to said prongs via said base positioned between said prongs and lifting extension.

36. The cooking apparatus as recited in claim 34 wherein said prongs comprise protrusions which extend into supporting relationship relative to said first grill and through which said prongs extend.

37. The cooking apparatus as recited in claim 34 further comprising a cooking container into which said rack is insertable and said prongs defining a periphery which is less than that of said first and second grills and said grills having a periphery which is less than an interior periphery of said cooking container.

38. The cooking apparatus as recited in claim 37 further comprising a grasping hook and said lifting extension having a hooked or looped section for grasping said lifting extension by said grasping hook.

39. The cooking apparatus as recited in claim 34 wherein said lifting extension is radially positioned outward of a periphery defined by a lower end of each of said prongs.

40. A method of assembling a cooking apparatus, comprising:

providing a plurality of prongs having a common base and protrusions formed in an intermediate area of said prongs;

providing a grill which is dimensioned for being slid past said prongs and into a support resting relationship relative to said protrusions.

41. The method of claim 40, further comprising a second grill spaced below said first grill.

* * * * *